(12) United States Patent
Chitrapu

(10) Patent No.: US 6,771,957 B2
(45) Date of Patent: Aug. 3, 2004

(54) COGNITION MODELS FOR WIRELESS COMMUNICATION SYSTEMS AND METHOD AND APPARATUS FOR OPTIMAL UTILIZATION OF A RADIO CHANNEL BASED ON COGNITION MODEL DATA

(75) Inventor: Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/305,048

(22) Filed: Nov. 25, 2002

(65) Prior Publication Data

US 2003/0157932 A1 Aug. 21, 2003

Related U.S. Application Data

(60) Provisional application No. 60/337,241, filed on Nov. 30, 2001.

(51) Int. Cl.[7] ............................ H04Q 7/20; H04B 17/00
(52) U.S. Cl. ................... 455/423; 455/422.1; 455/67.1; 455/524; 455/418; 703/2; 703/20; 342/450; 342/457
(58) Field of Search ................................ 455/423–425, 455/418–420, 446, 449, 67.1, 424, 524–525, 561, 422.1, 78, 83, 550.1, 552.1, 575.7, 456.1; 703/20–22, 215, 18; 342/450, 457, 357.01, 37

(56) References Cited

U.S. PATENT DOCUMENTS 5,598,532 A    1/1997  Liron
5,711,000 A *  1/1998  Ploeg et al. ................. 455/423
5,794,128 A    8/1998  Brockel et al.
5,798,726 A *  8/1998  Schuchman et al. .......... 342/37
5,953,669 A    9/1999  Stratis et al.
6,141,565 A * 10/2000  Feuerstein et al. .......... 455/560
6,249,252 B1 *  6/2001  Dupray ....................... 342/450
6,317,599 B1  11/2001  Rappaport et al.
6,356,758 B1 *  3/2002  Almeida et al. ............. 455/446
6,453,151 B1 *  9/2002  Kiang et al. .............. 455/67.11
6,499,006 B1  12/2002  Rappaport et al.
2002/0160748 A1 * 10/2002 Rahman et al. ............. 455/406

OTHER PUBLICATIONS

Cognitive Radio: Making Software Radios More Personal, Joseph Mitola III and Gerald Q. Maquire, Jr., IEEE Personal Communications, Aug. 1999, pp. 13–18.

* cited by examiner

Primary Examiner—Erika Cary
Assistant Examiner—Kamran Afshar
(74) Attorney, Agent, or Firm—Volpe and Koenig, P.C.

(57) ABSTRACT

Classes of cognition models which may include: 1) Radio Environment models, 2) Mobility models and 3) Application/User Context models are utilized in a wireless communications network. Radio Environment models represent the physical aspects of the radio environment, such as shadowing losses, multi-path propagation, interference and noise levels, etc. Mobility models represent users motion, in terms of geo-coordinates and/or logical identifiers, such as street names etc. as well as speed of user terminal etc. The context model represents the present state and dynamics of each of these application processes within itself and between multiple application processes. These data are employed to optimize network performance.

6 Claims, 4 Drawing Sheets

| RADIO RELATED ATTRIBUTES | • MULTIPATH ATTRIBUTES<br>• SHADOWING ATTRIBUTES<br>• DOPPLER ATTRIBUTES |
|---|---|
| GEO-LOCATION RELATED ATTRIBUTES | • BUILDINGS<br>• TREES<br>• ATMOSPHERIC ATTRIBUTES |

*FIG.3*

- GEO-CORDINATES
- VELOCITY
- ROAD TOPOLOGY, INCLUDING TRAFFIC LIGHTS ETC.
- TRAFFIC DENSITY

*FIG.4*

| | |
|---|---|
| APPLICATION MICRO-DATA-FLOW MODEL | • SPEECH ACTIVITY STATISTICS<br>• (IP) PACKET DATA STATISTICS |
| APPLICATION MICRO-DATA-FLOW MODEL | • EMAIL DOWNLOAD FOLLOWED BY ATTACHMENT DOWNLOAD FOLLOWED BY DOCUMENT VIEWING PROCESS<br>• HTTP WEB PAGE OBJECT DISTRIBUTION STATISTICS |
| APPLICATION CONTROL-SYNTAX MODEL | • 3-WAY TCP HANDSHAKE PROCESS<br>• HTTP SIGNALING MESSAGES<br>• MOBILITY MANAGEMENT PROTOCOLS, SUCH AS LOCATION UPDATES, CONTEXT TRANSFER ETC.<br>• ESSENTIALLY, ANY SEQUENCE FLOW PROCESS |
| MULTI-APPLICATION DYNAMICS MODEL | • EMAIL & INSTANT MESSAGING |

*FIG.5*

COGNITION MODELS FOR WIRELESS COMMUNICATION SYSTEMS AND METHOD AND APPARATUS FOR OPTIMAL UTILIZATION OF A RADIO CHANNEL BASED ON COGNITION MODEL DATA

CROSS REFERENCE TO RELATED APPLICATIONS

This application claims priority from U.S. provisional application No. 60/337,241 and filed on Nov. 30, 2001 which is incorporated by reference as if fully set forth.

FIELD OF THE INVENTION

The present invention relates to wireless communications. More particularly, the present invention relates to cognitive radio and the employment of multiple classes of cognitive radio modelers in wireless communications and method and apparatus making optimal use of the radio channel based on information from the cognitive modelers.

BACKGROUND

Cognitive Radio involves three layers: cognition models, a language for communicating the descriptors of the cognition models and a processor for analyzing cognition descriptors and making decisions. The invention encompasses three classes of cognition models.

SUMMARY OF THE INVENTION

Three classes of cognition models are proposed as follows:
1) Radio Environment models,
2) Mobility models and
3) Application/User Context models.

Radio environment represents the physical aspects, mobility predicts the future positions of a user terminal while the application represents the present state and dynamics of each of these application processes within itself and between multiple application processes.

BRIEF DESCRIPTION OF THE DRAWINGS

The invention will be understood from the following description and drawings in which like elements are designated by like numerals and, wherein:

FIG. 3 outlines the physical model attributes of the present invention;

FIG. 4 depicts the mobility modeler attributes of the present invention; and

FIG. 5 describes the application context models of the present invention.

DETAILED DESCRIPTION OF THE PREFERRED EMBODIMENTS

The invention proposes three classes of cognition models:
1) Radio Environment models,
2) Mobility models and
3) Application/User Context models.

Radio Environment models represent the physical aspects of the radio environment, such as shadowing losses, multipath propagation, interference, noise levels, etc.

Mobility models represent users motion, in terms of geo-coordinates and/or logical identifiers, such as street names etc. as well as speed of movement of user terminals, etc. The Mobility models are used for predicting future positions of the user terminal.

Application/User Context represents the application environment that the user is presently in and can be used for predicting the application environment in future time instants. For example, an application context may consist of a user browsing the web using http/tcp/hip protocols, user talking on a voice call, involved in a file transfer, such as music download, etc.

The context model represents the present state and dynamics of each of these application processes per se and between multiple application processes. For example, Internet browsing is often modeled in terms of packet session, packet calls, number, duration and separation of individual packets etc. This represents the context modeling within an application process. The context modeling between multiple application processes consists of representing the dynamics of how users may move from one application process to another, etc.

Figure 1:
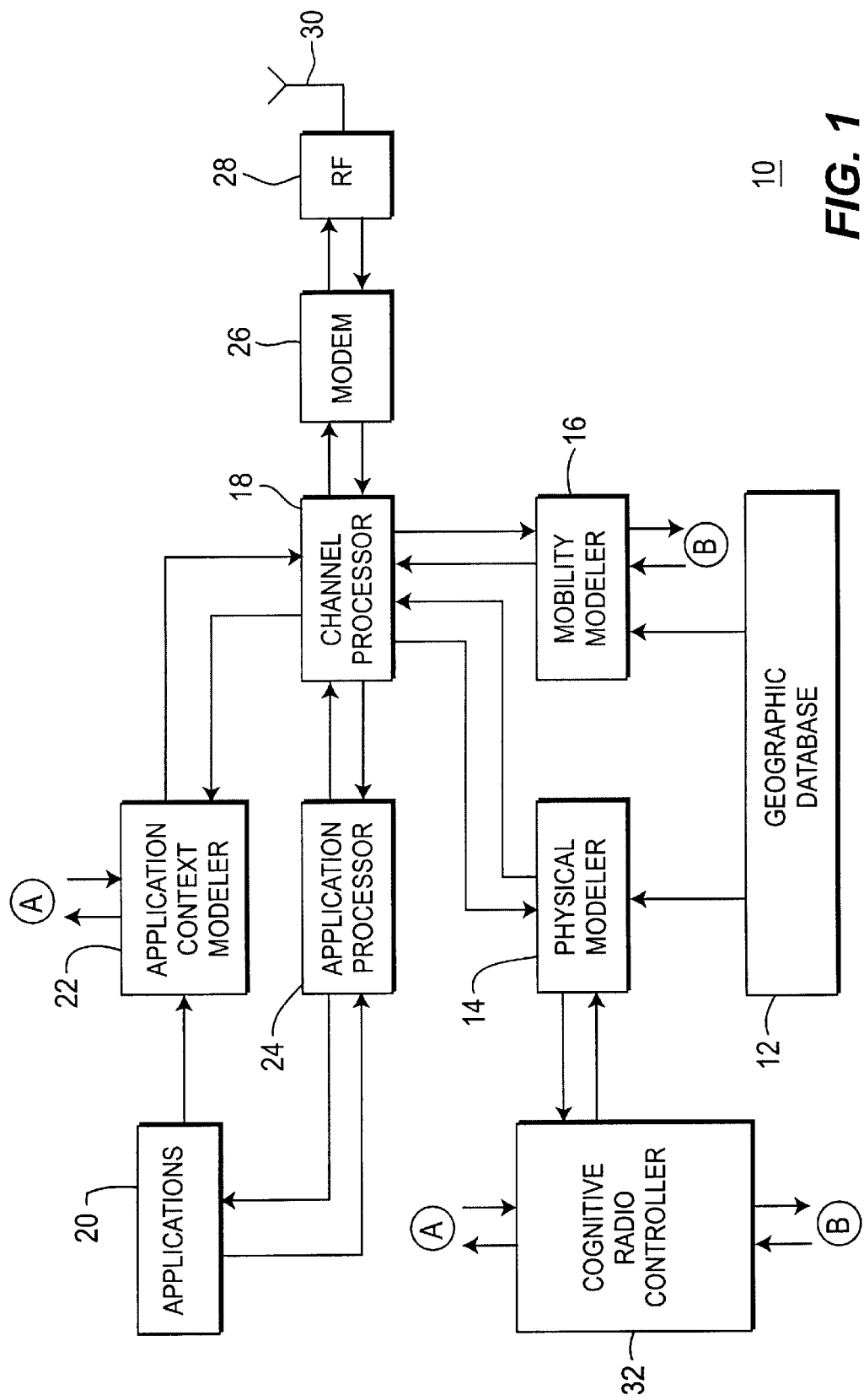
FIG. 1 is a block diagram of a user equipment (UE) embodiment of the present invention.
Figure 2:
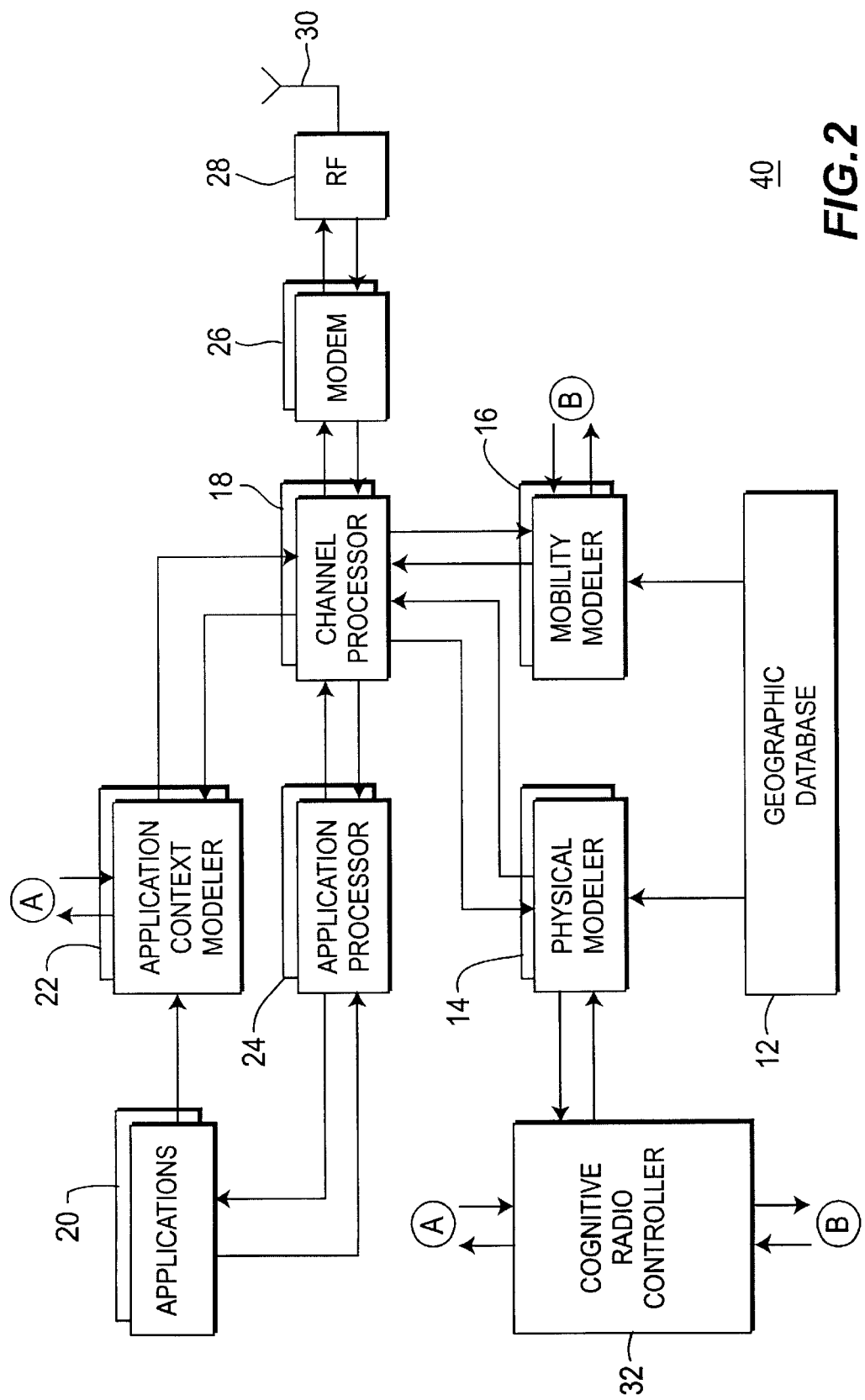
FIG. 2 is a block diagram of a network embodiment of the present invention.

FIGS. 1 and 2 respectively show embodiments of a user equipment (UE) and a network, based on the principles of cognitive radio and the three types of cognition models described above.

FIG. 1 is an embodiment employing three types of cognition models, while FIG. 2 is an example of cognitive radio network, employing three types of cognition models and a cognitive radio resource manager. Tables 1 (FIG. 2), 2 (FIG. 3) and 3 (FIG. 4) detail the attributes of the physical, mobility and context modelers respectively. The three parts are independent. Systems can be built using one or more of the three classes of models.

FIG. 1 shows the user UE 10 comprising a geographic data base 12, a physical modeler 14 and a mobility modeler 16. The geographic database stores geo-locations and location related attributes for the geo-locations which may include land formations, such as hills, mountains, etc., buildings, trees, atmospheric attributes, etc. The physical modeler 14 provides radio related attributes such as multipath attributes, shadowing attributes and Doppler attributes associated with the geographic locations.

The mobility modeler 16 provides information associated with UEs such as their geo-coordinates, velocity, road topology along which UEs may be traveling including traffic lights, etc. and traffic density. This data is transferred to the channel processor 18 which prepares the data for transmission to modem 26, i.e. maps the application data to the channel and identifies received data and directs the received data to the proper destination. The data, at baseband, is modulated with an appropriate radio frequency at 28 and transmitted through antenna apparatus 30 for communication with the network.

The applications which may include internet browsing, speech activity e-mail, instant messaging, etc. are provided to the application context modeler 22 and application processor 24 for modeling. For example, internet browsing is often modeled in terms of packet session, packet calls, number, duration and separation of individual packets, etc. This data is provided to the channel processor 18 for subsequent transmission, in the manner described hereinabove with regard to mobility and physical modelers 14 and 16, respectively. The various applications handled by application circuitry 20, are shown in FIG. 5. The application processor 24 incorporates the coding and processing for forwarding data to the proper destination, for example, providing the necessary coding and processing for internet browsing (TCP/IP), voice communication, images, short message service (SMS); and multimedia service (MMS).

FIG. 2 shows a network unit, wherein like elements are designated by like numerals and further including a cognitive radio resource controller (RRC) respectively coupled to the application context, physical and mobility modelers 22, 14, and 16. The RRC 32 normally controls optimal transmission of packets over the air and further manages spectral resources to ensure that quality of service (QoS) is maintained. User traffic and radio channel performance is routinely monitored for purposes of controlling air interface parameters. Air bandwidth allocation and revenue maximization are controlled, together with carrier policies, to assure QoS is judiciously applied to generate revenue based on usage charges, subscription, or other subscriber policies. The RRC utilizes information from the modelers 14, 16 and 22 to make more efficient use of the radio channel.

Typically, the physical modeler 14 makes a number of measurements of the radio channel. For example, physical modeler 14 measures the interference levels and/or noise levels; measures the channel impulse response; and estimates the multipath characteristics. These characteristics include the total energy, the delay spread, the number of significant paths (also called 'fingers') and the locations of these significant paths; Doppler shifts; the large scale path losses, etc. The art of these measurements is well established in the literature. In addition, the physical modeler 14 may also determine the location of one or more UEs. When the modeler 14 is implemented in the UE, then it may determine its own location, whereas if it is implemented in the Network, it may determine the locations of more than one UE. The UE may determine its own location by a global positioning system (GPS), not shown for purposes of simplicity, or Network assisted GPS. The Network may determine the locations of UEs employing Base Station triangulation principles.

The location information may be related to a local geographic map and related to roads, intersections, landmarks, buildings, hills, parks, etc. Based on such relations, the physical radio environment may be characterized as being indoor, dense urban, urban, rural, hilly, highway etc. These measurements form the parameters of the physical modeler 14.

Similarly, the mobility modeler 16 estimates the future locations of the UE or UEs in relation to a geographic map. For instance, if the UE is located on a highway and is moving at a certain velocity, then its future positions can be estimated. In case the UE is located near an intersection in a downtown area, then the road information will provide several alternatives for the future locations with associated probabilities. The set of possible future positions of a UE, together with associated probabilities become the parameters of the mobility modeler 16.

Finally, the application context is modeled. Depending upon the specific application the user is engaged in, the current and future data rate and QoS requirements can be estimated. For example, assuming the user (UE) is engaged in a voice conversation, then the amount of data generated can be modeled based on general speech characteristics and the voice compression algorithm currently being used. Similarly, if the user is engaged in a web browsing session, the packet flows can be modeled in a statistical fashion. For example, web browsing is typically performed employing TCP/IP protocol, which has a certain structure. As an example, the TCP session is always preceded by a 3-way handshake, involving small amounts of data transfer. This is typically followed by a number of request-response type transactions. The request messages are small in size, whereas the response can be much larger. Similarly, email applications, file transfer protocol (FTP) applications, short message system (SMS) applications, multimedia system (MMS) applications, picture messaging applications, etc. can be characterized by the protocol structure and data statistics. These characteristics form the parameters of the application context modeler 22.

The various modelers can be implemented in the UE and/or the Network. The network and optionally the UE also implements a so-called cognitive controller, shown as a radio resource controller 32, which accepts the parameters from modelers 14, 16 and 22 as inputs and processes them for determining optimal radio performance. Specifically, the cognitive controller (RRC) 32 determines optimal data rates, error correction coding schemes, antenna beam widths, power levels, application queue dimensions, etc. The current radio parameters are accordingly adjusted. In some cases, new processes may be invoked, such as the turning on or off of acknowledged mode of radio data transmission. In such cases, radio parameters are either selected or aborted. The cognitive controller (RRC) 32 in the UE and in the network may be input with local cognition model parameters, as in the case of local optimization in a UE or the network. The cognitive controller (RRC) in the network may also be input with local cognition model parameters as well as cognition model parameters of various UEs, which have been transmitted to the network. In this case, each UE uses one or more of the radio channels and reports the cognition model parameter data. A suitable set of messages and reporting structure is used for the protocol. The network then processes the local as well as remote (i.e., from the UEs) cognition model data and generates various adjustments for optimal or improved performance. While some of these adjustments are affected locally in the network, the others would be transmitted to the concerned UE, using appropriate command protocols. This results in a cognitive radio system, which strives to perform optimally in changing physical, user and application conditions by using the data generated by the various cognition models.

What is claimed is:

1. A wireless network comprising a base station (BS) and a plurality of user equipment (UEs):

each said UE comprising:
   a radio environment modeler for modeling the radio environment in the geographic vicinity of the UE and generating UE radio environment data;
   a mobility modeler for modeling UE mobility attributes and generating UE mobility data;
   a context modeler for modeling the context of each application currently being run by the UE and generating UE context data; and
   a cognitive controller for forwarding said UE radio environment data, said UE mobility data, and said context data to the BS; and said BS comprising:
   a modeler for modeling the radio environment in the geographic vicinity of the BS and generating BS radio environment data; and
   a cognitive controller for adjusting and selecting operational parameters based upon said BS radio environment data, said UE radio environment data, said UE mobility data, and said UE context data from the UEs;

whereby each said mobility modeler models at least one of street topology, velocity and traffic density.

2. A wireless network comprising a base station (BS) and a plurality of user eguipment (UEs):

each said UE comprising:
  a radio environment modeler for modeling the radio environment in the geographic vicinity of the UE and generating UE radio environment data; and
  a cognitive controller for forwarding said UE radio environment data to the BS; and said BS comprising:
  a modeler for modeling the radio environment in the geographic vicinity of the BS and generating BS radio environment data;
  a mobility modeler for modeling UE mobility attributes and generating UE mobility data; said mobility modeler modeling at least one of street topology, velocity and traffic density;
  a context modeler for modeling the context of each application currently being run by the UE and generating UE context data; and
  a cognitive controller for adjusting and selecting operational parameters based upon said BS radio environment data, said UE radio environment data, said UE mobility data, and said UE context data.

3. The network of claim 2 wherein each of the UE includes a means for sending at least one of data modeled by the radio environment modeler.

4. The network of claim 3 wherein the BS includes a means for receiving modeled data from said UEs.

5. A wireless network comprising a base station (BS) and a plurality of user eguipment (UEs):

each said UE comprising:
  a radio environment modeler for modeling the radio environment in the geographic vicinity of the UE and generating UE radio environment data;
  a mobility modeler for modeling UE mobility attributes and generating UE mobility data; said mobility modeler modeling at least one of street topology, velocity and traffic density; and
  a cognitive controller for forwarding said UE radio environment data and said UE mobility data to the BS; and said BS comprising:
  a modeler for modeling the radio environment in the geographic vicinity of the BS and generating BS radio environment data;
  a context modeler for modeling the context of each application currently being run by the UE and generating UE context data;
  a cognitive controller for adjusting and selecting operational parameters based upon said BS radio environment data, said UE radio environment data, said UE mobility data, and said UE context data; and
  a means for sending adjustment/selection data to at least one of said UEs responsive to the cognitive controller.

6. A wireless network comprising a base station (BS) and a plurality of user eguipment (UEs):

each said UE comprising:
  a radio environment modeler for modeling the radio environment in the geographic vicinity of the UE and generating UE radio environment data;
  a mobility modeler for modeling UE mobility attributes and generating UE mobility data; said mobility modeler modeling at least one of street topology, velocity and traffic density; and
  a cognitive controller for forwarding said UE radio environment data and UE mobility data to the BS; and said BS comprising:
  a modeler for modeling the radio environment in the geographic vicinity of the BS and generating BS radio environment data;
  a context modeler for modeling the context of each application currently being run by the UE and generating context data;
  a cognitive controller for adjusting and selecting operational parameters based upon said BS radio environment data, said UE radio environment, said UE mobility data, and said UE context data; and
  a means for adjusting transmission parameters responsive to the context modeler.

\* \* \* \* \*

UNITED STATES PATENT AND TRADEMARK OFFICE
CERTIFICATE OF CORRECTION

PATENT NO. : 6,771,957 B2 Page 1 of 1
DATED : August 3, 2004
INVENTOR(S) : Prabhakar R. Chitrapu It is certified that error appears in the above-identified patent and that said Letters Patent is hereby corrected as shown below:

<u>Column 2,</u>
Line 10, delete "http/tcp/hip" and insert therefor -- http/tcp/ip --.

Signed and Sealed this

Nineteenth Day of October, 2004

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,771,957 B2 | Page 1 of 1 |
| APPLICATION NO. | : 10/305048 | |
| DATED | : August 3, 2004 | |
| INVENTOR(S) | : Prabhaker R. Chitrapu | |

It is certified that error appears in the above-identified patent and that said Letters Patent is hereby corrected as shown below:

At Column 5, line 2, delete "eguipment" and insert therefor --equipment--.

At Column 5, line 31, delete "eguipment" and insert therefor --equipment--.

At Column 6, line 16, delete "eguipment" and insert therefor --equipment--.

Signed and Sealed this

Twenty-third Day of October, 2007

JON W. DUDAS
*Director of the United States Patent and Trademark Office*